Figure 1:
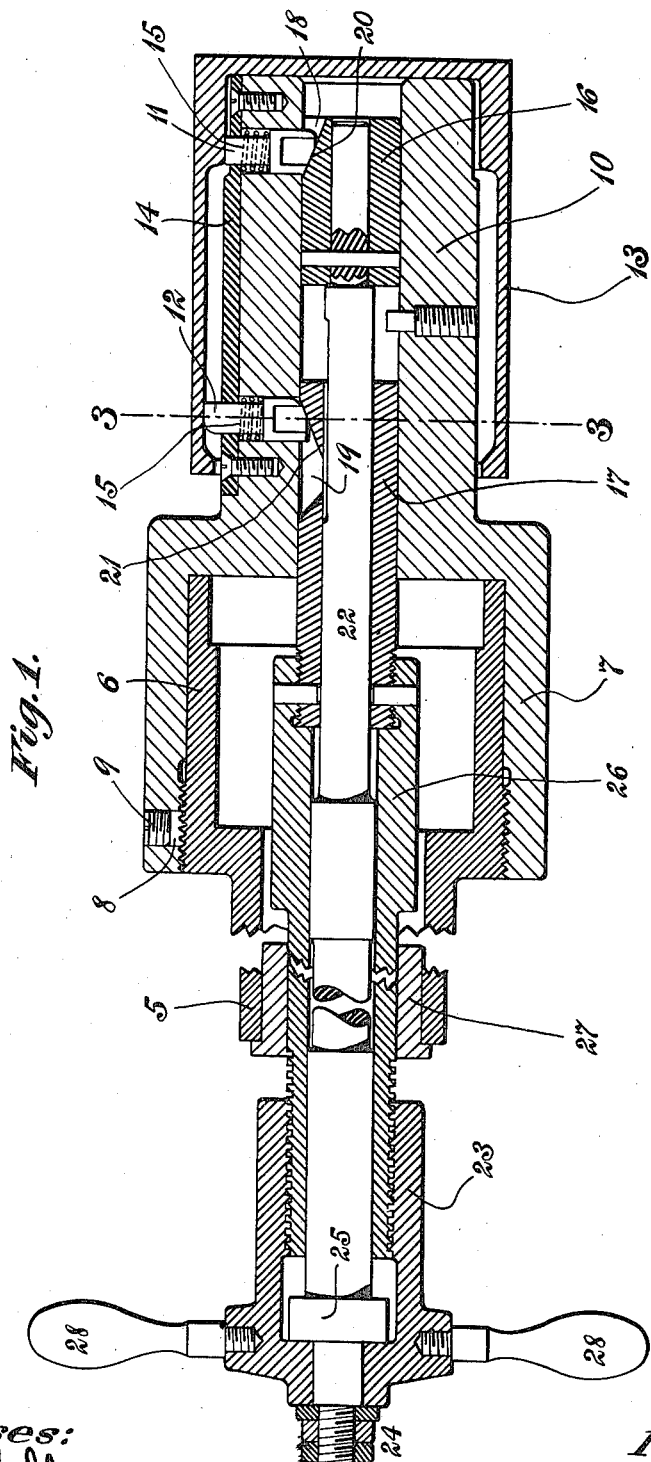

C. L. GOODRICH.
CHUCK.
APPLICATION FILED NOV. 10, 1909.

984,809.

Patented Feb. 21, 1911.
2 SHEETS—SHEET 1.

Witnesses:

Inventor:
C. L. Goodrich
By his Attorneys,

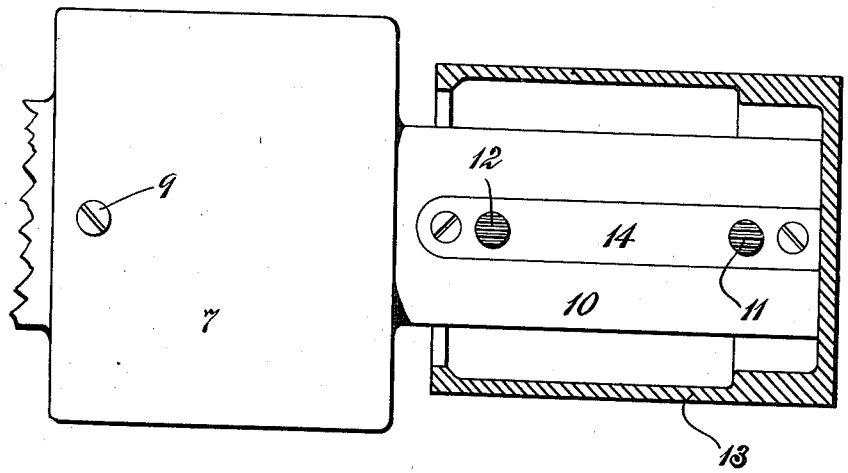
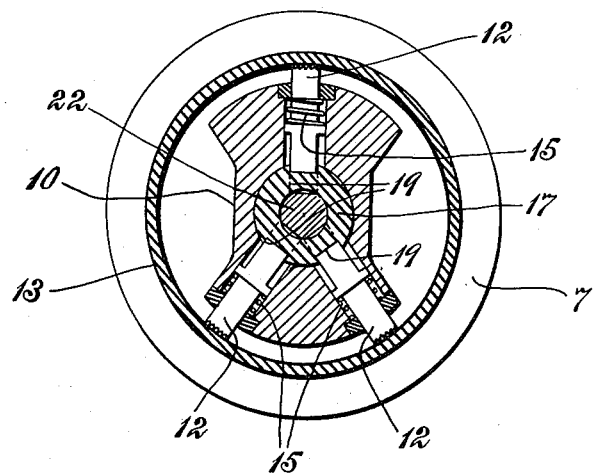

UNITED STATES PATENT OFFICE.

CLARENCE L. GOODRICH, OF HARTFORD, CONNECTICUT, ASSIGNOR TO PRATT & WHITNEY COMPANY, OF HARTFORD, CONNECTICUT, A CORPORATION OF NEW JERSEY.

CHUCK.

984,809.          Specification of Letters Patent.       Patented Feb. 21, 1911.

Application filed November 10, 1909. Serial No. 527,139.

*To all whom it may concern:*

Be it known that I, CLARENCE L. GOODRICH, a citizen of the United States, residing at Hartford, in the county of Hartford and State of Connecticut, have invented certain new and useful Improvements in Chucks, of which the following is a specification.

This invention relates to chucks and the object of the invention is to provide an effective device of this character wherein the work will be rigidly centered.

A chuck comprising the invention can be employed with advantage in many different connections for example with a turret lathe and it is preferably of such nature as to hold tubular or hollow work.

In the drawings accompanying and forming part of the present specification I have represented in detail one convenient form of embodiment of the invention which to enable those skilled in the art to practice the same will be set forth fully in the following description while the novelty of the invention will be included in the claims succeeding said description.

Referring to said drawings, Figure 1 is a longitudinal sectional view of a chuck comprising my invention and showing the same operatively associated with the work-spindle of a turret-lathe. Fig. 2 is a top plan view of the front end of said chuck the work held thereby being in section, and, Fig. 3 is a cross section on the line 3—3 of Fig. 1.

Like characters refer to like parts throughout the several figures.

From what has been set forth it will be clear that a chuck in which is embodied my invention can be used in conjunction with different kinds of machines and while it is especially applicable to holding tubular work some features of the chuck may be utilized in a device of this nature when the work to be held is solid.

The mounting of the chuck will depend upon the particular machine with which it is used; in the case of a turret-lathe the chuck will be carried by and rotative with the work-spindle and I have shown partially such a work-spindle in Fig. 1 the same being denoted by 5. None of the means usually employed for turning said spindle is illustrated. The nose portion or head of the spindle is represented as enlarged as at 6 to receive the body 7 of the chuck said body being shown as consisting of a shell of substantially cylindrical form threaded onto the enlarged portion of said spindle whereby the chuck can be easily applied and removed. To rigidly hold the body to the spindle any suitable means may be provided; for this purpose I have shown a shoe 8 and screw 9, the latter being tapped through the chuck body and being adapted when properly turned to press the shoe against the periphery of the spindle nose or enlarged portion 6. The chuck body 7 has a tubular or hollow extension 10 and it is around this extension in the present case that the work fits being rigidly held in place thereon by suitable means such as will be hereinafter described. Said tubular extension also incloses some of the operating parts of the chuck jaws, which are preferably made in the form of two series of pins. As will hereinafter appear means are provided for applying equal pressures to the pins of each set which is advantageous even where only one set of pins is employed which is a possible construction. Said means is also of such character as to equalize in a positive manner, the pressures or thrusts against the pins of both sets so that the two sets will hold the work absolutely concentrically with the work-spindle, by reason of which precisionized results can be obtained.

The pins of the forward set are denoted each by 11 while all the pins of the rear set are designated by 12 and as shown in Fig. 3 there are three pins in each set. It will be therefore obvious that the two sets of pins present three-point supports for the work—denoted by 13—and which is assumed to be a piston blank. The work surrounds the two sets of pins and the tips of the latter where they engage the interior surface of the work are preferably roughened as shown in Figs. 2 and 3 to get a good purchase on the work.

The two sets of pins operate radially of the reduced forward extension 10 the latter having radial perforations or openings to receive said pins for sliding movement. Several plates or strips 14 are set into the periphery of the extension 10 being secured in place in any desirable manner, for instance by screws, and they are perforated for the passage of the reduced outer ends of the pins 11 and 12. The reduced portions of said pins are surrounded by coiled push springs 15 which bear against the respective plates 14 and the shoulders on the pins, formed by the reduction thereof. The normal tendency of these springs is to thrust or push the several pins inward this action being resisted or opposed by means such as will be hereinafter described. The constant tendency therefore of said springs is to retract the pins.

As a means for operating the two sets of pins I prefer to employ cam devices and while said cam-devices may take various forms I find that they can with advantage be made in the form of concentric wedges and these devices are so related with the two sets of pins as to cause one set of pins to operate reactively against the other the result being that the two sets of pins will apply their maximum effects to the work at the same time and equally.

Cam devices such as satisfactorily answer my purpose are those designated by 16 and 17 respectively and they both have a sliding fit within the tubular extension 10 and move longitudinally of the latter. Said cam-devices which are usually made in the form of sleeves, have peripheral slots 18 and 19 respectively each device as will be understood having three of such slots and the bottoms thereof are preferably made sloping as at 20 and 21 respectively to present wedge portions. These wedge surfaces receive the tails or butts of the respective sets of pins and they serve when the cam or wedge devices 16 and 17 are moved in the proper direction (in the present case away from each other), to thrust the several pins outward in opposition to the springs 15. In Fig. 1 the two sets of pins 11 and 12 are pressed out in firm contact with the inner surface of the work by the two cam devices 16 and 17; when said cam devices are caused to approach the springs 15 can force the said sets of pins inward to remove the work.

Pinned or otherwise suitably secured to the cam device 16 is a rod 22 which extends into the tubular wedge device as shown clearly in Fig. 1. This rod serves conveniently to move the device 16 back and forth being manually-operable as will hereinafter more particularly appear and it extends through the chuck-body 7 and also entirely through the work-spindle 5. Said rod 22 is shown as carrying a feed nut 23 of substantially cup form and through the head of which the outer end of said rod 22 projects, being provided with check and holding nuts 24 and a fixed collar 25 to prevent movement of the nut longitudinally of the said rod. The nut, however, is adapted to freely turn on the rod.

The operating device for the cam device 17 is shown as being in the form of a tube 26 which receives and which slides on the rod 22, said tube 26 being shown as threaded onto and pinned to the cam-device 17, a simple means for connecting said two parts.

It will be clear that when the member 26 is moved endwise a corresponding movement of the cam device 17 follows. The tube 26 passes entirely through the spindle 5 and moves longitudinally thereof, said spindle having a bushing 27 at its outer extremity to receive and support said tube 26:

The nut 23 is provided with suitable means to effect its easy manipulation and for this purpose I have shown it equipped with several arms 28, and said nut is represented as being in threaded engagement with the elongated tube 26.

It will be apparent that when the nut 23 is turned there will be a relative longitudinal movement of the cam devices 16 and 17, through the described connections the latter being as will be obvious of such a nature as to cause each cam device to reactively and unyieldingly operate against the other so that I insure the jaws being set absolutely with the same pressure. Should one jaw come against the work before the other with a certain pressure this jaw acting through the described connections against the companion jaw will cause the latter to press against the work with precisely the same amount of pressure.

It will be assumed that the several pins 11 and 12 are in and that it is desired to project said pins outward or to set the two jaws of the chuck which jaws are made up of said pins. To do this the nut 23 is turned, thereby through the intervening parts causing a separation longitudinally of the spindle, of the two cam-devices 16 and 17 and as the two cam devices move away from each other the wedge faces 20 and 21 by acting against the two series of said pins 11 and 12 thrust said pins outward against the work which had been previously placed around said two sets of said pins. There follows then the reaction to which I have already alluded. In view of this reaction I provide a positive and certain means for applying to the two jaws exactly equal pressures so that the work will be held truly centered.

What I claim is:

1. A chuck comprising a body, a plurality of sets of pins constituting jaws, carried and guided for radial movement by said body, and means for setting the sets of pins or jaws and for causing unyieldingly the reaction of one against the other.

2. A chuck comprising a body, a plurality of sets of pins, constituting jaws carried and guided for radial movement by said body, and means within said body for setting one set of pins and for causing positively the unyielding reaction of each set against the other.

3. A chuck comprising a body, longitudinally separated jaws supported and guided for radial movement by said body, cam devices for operating against the respective jaws, and a manually operable member, and connections between said manually operable member and the cam devices for operating the same and for causing the reaction of each against the other.

4. A chuck comprising a body, longitudinally separated jaws carried and guided for radial movement by said body, cam devices in the body for acting against the respective jaws, a manually operable member, and connections between said manually operable member and the cam devices for operating the latter to set the jaws and for also causing the reaction of each jaw against the other.

5. A chuck comprising a body, longitudinally separated jaws carried and guided for radial movement by said body, cam devices in the body for operating the respective jaws, a rod connected with one of the cam devices, a sleeve connected with the other cam device, and a nut having a threaded connected with said sleeve, and a swiveled connection with said rod.

6. A chuck comprising a body, two sets of pins carried by said body the latter having openings for the movement of the pins, cam-devices in the body for operating against the butts of said pins, members connected with the respective cam-devices, and a nut rotatively connected with one of said members and having a threaded connection with the other member.

7. A chuck comprising two sets of pins each constituting a jaw, guiding means for said pins, cam-devices for operating against the respective pins to set the same, a rod connected with one of the cam-devices, a sleeve connected with the other cam device, and a device for operating said rod and sleeve relatively to each other.

8. A chuck comprising two sets of pins each constituting a jaw, guiding means for said pins, cam devices for operating against the respective pins to set the same, two members rigidly connected with the respective cam devices, and a manually-operable member associated with said other members and operative for securing a relative movement of the latter.

9. A chuck comprising two sets of pins each constituting a jaw, guiding means for the pins, cam devices for operating the respective sets of pins, a rod connected with one of the cam devices, a sleeve connected with the other cam device and surrounding said rod, and a nut rotatably supported by said rod and having a screw-thread connection with said sleeve.

10. A chuck comprising a body provided with a tubular extension, two sets of pins each set constituting a jaw, said extension having openings to receive the respective pins, a pair of sleeves slidable in said extension longitudinally thereof and each having wedge faces to engage the butts of the respective sets of pins, two members one rigidly connected with one sleeve and the other with the other sleeve, and a nut rotatively connected with one of said members and having a threaded connection with the other.

In testimony whereof I affix my signature in presence of two witnesses.

CLARENCE L. GOODRICH.

Witnesses:
B. M. W. HANSON,
W. M. STORRS.